United States Patent [19]
Joseph et al.

[11] Patent Number: 5,721,763
[45] Date of Patent: Feb. 24, 1998

[54] METHOD FOR PROVIDING INFORMATION DURING A CHAT SESSION

[75] Inventors: Eugene John Joseph; Rosemarie C. Newberry, both of Shrewsbury; Thomas D. Snodgrass, Bridgewater; Dale Eugene Stone, Hanover, all of N.J.

[73] Assignee: AT&T Corp, Middletown, N.J.

[21] Appl. No.: 594,552

[22] Filed: Jan. 31, 1996

[51] Int. Cl.⁶ .............................. H04M 3/56; H04Q 3/72
[52] U.S. Cl. .................. 379/88; 379/112; 379/127; 379/204
[58] Field of Search ..................... 379/204, 205, 379/202, 158, 67, 88, 201, 112, 127

[56] References Cited

U.S. PATENT DOCUMENTS

| | | | |
|---|---|---|---|
| 4,850,007 | 7/1989 | Marino et al. | 379/67 |
| 5,199,062 | 3/1993 | Von Meister et al. | 379/67 |
| 5,333,186 | 7/1994 | Gupta | 379/201 |
| 5,414,754 | 5/1995 | Pugh et al. | 379/67 |
| 5,483,588 | 1/1996 | Eaton et al. | 379/202 |
| 5,583,925 | 12/1996 | Bernstein | 379/202 |

OTHER PUBLICATIONS

"Alliance Teleconferencing Services Boost Business Efficiency", E.D. Haszto and N.D. Weber, AT&T Technology, vol. 3, No. 1, 1988, pp. 21–31.

*Primary Examiner*—Thomas W. Brown
*Attorney, Agent, or Firm*—Robert B. Levy

[57] ABSTRACT

A subscriber to a chat service is provided with at least one announcement by the chat service provider about product and/or service offerings available to the subscriber from the chat service provider. The announcement typically takes the form of a menu of choices, thereby prompting the subscriber to respond. Following the announcement, the chat service provider listens for the subscriber's response. If the subscriber elects to accept the offer, then the chat service provider undertakes the necessary action to provide the offered product and/or service. The announcement may be made to the subscriber prior to bridging of the subscriber's call to facilitate entry of the subscriber into a chat session. Alternatively, or in addition, the announcement may be made after the subscriber has entered the chat session, but before (or after) the subscriber has requested an enhanced chat service feature, such as a private conversation or information access.

14 Claims, 1 Drawing Sheet

METHOD FOR PROVIDING INFORMATION DURING A CHAT SESSION

TECHNICAL FIELD

This invention relates to a technique for providing information to a caller to a chat session.

BACKGROUND ART

Many on-line computer services offer their subscribers the opportunity to meet anonymously and converse by sharing text files with each other. A subscriber logged into an on-line computer service can choose from a variety of "chat rooms" (i.e., groups of other computer users) that are sharing text files about a particular subject of interest. Upon entering a particular chat room, the subscriber may choose to have a private or "side bar" conversation with one or more other subscribers within the same chat room. Each side bar conversation is private from the standpoint that the conversation is separate from the ongoing conversation within the chat room itself. In other words, each private conversation between two or more subscribers is essentially a new chat room.

The concept of allowing two or more individuals at separate locations to anonymously communicate with each other is now being offered by telephone service providers. To communicate anonymously with other callers, a telephone subscriber dials a telephone number associated with a telephone bridge maintained by a chat service provider, e.g., a Local Exchange Carrier (LEC) or an Inter-Exchange Carrier (IXC), such as AT&T. The telephone bridge couples or bridges an incoming call from a subscriber to other subscribers who have dialed the same number. In this way, the subscribers who have dialed a particular bridge number can enter a "chat session" and converse with each other. Certain types of telephone bridges, such as those maintained by AT&T, have the capability of allowing two or more subscribers who have dialed the bridge, to have their calls privately bridged to the exclusion of others connected to the same bridge. This type of "private" bridging is comparable to the situation when two subscribers to an on-line computer service enter a private conversation after entering a chat room.

Invariably, many telephone subscribers who routinely request their calls be privately bridged during a chat session later engage in one or more private telephone conversations outside the chat service. Unless such subscribers live within the same local telephone calling area, then such callers may incur a toll charge for such calls. For an inter-exchange carrier that offers chat services, a marketing opportunity exists to capture the additional business that may be generated by chat service subscribers who engage in such private conversations. One way a carrier could gain share of such caller traffic would be to offer discounts to those subscribing to the chat service. However, in the absence of any knowledge of discounts, the subscriber may place his or her calls over a different carrier.

Thus, there is a need for a technique for alerting a chat service subscriber of service offerings by the provider of the chat service.

BRIEF SUMMARY OF THE INVENTION

Briefly, a method is provided for alerting a caller to a chat service about product and/or service offerings by the provider of the chat service. Initially, a caller seeking access to a chat service dials the telephone number associated with the service. After connection to the chat service, the chat service provider may announce a brief menu of product and/or service offerings. For example, the menu could include information about a special long distance service plan especially tailored to chat service callers. In addition, the menu could also include a discount for the chat service itself. After announcing the menu, the chat service provider then "listens" for either a voice response or Dual-Tone Multi-Frequency (DTMF) (touch tone) signals entered by the caller through appropriate buttons on the caller's telephone. The response is then recognized and thereafter translated into subscriber selection data representing the caller's desire (or lack thereof) to enroll or otherwise receive the offering.

Alternatively, the caller-entered commands may trigger an announcement about additional offerings, possibly in the form of additional menus. Such additional announcements will prompt the caller to enter additional responses, including the caller's enrollment in the announced service offering. The caller ultimately exits the menu, either by affirmatively making a particular data entry, or by doing nothing and waiting a prescribed interval. After exiting the menu, the caller is connected to the chat service.

The chat service provider may choose not to make an announcement about selected product and/or service offerings prior to bridging the incoming call to admit the caller to the chat session. Rather, the chat service provider could make such an announcement after the caller has joined the chat session, but before providing the caller the opportunity to receive an enhanced chat service feature requested by the caller. For example, after the caller has been admitted to a chat session, the caller may request that his or her call be privately bridged to a select subset of callers participating in the ongoing chat session. Alternatively, the caller may request access to certain information offered by the chat service. After receiving a request for such an enhanced feature, the chat service provider may choose to announce selected product and/or service offerings. Following such an announcement, the chat service provider would then listen for the caller's response and react as discussed previously. Thereafter, the caller receives the requested enhanced chat service feature (e.g., bridging to a private conversation) consistent with the product and/or service offering selected by the caller. Rather than announce selected product and/or service offerings prior to providing the caller with the enhanced chat service feature requested by the caller, the chat service provider could announce its selected offering after the caller received the enhanced chat service feature.

DETAILED DESCRIPTION

Figure 1:
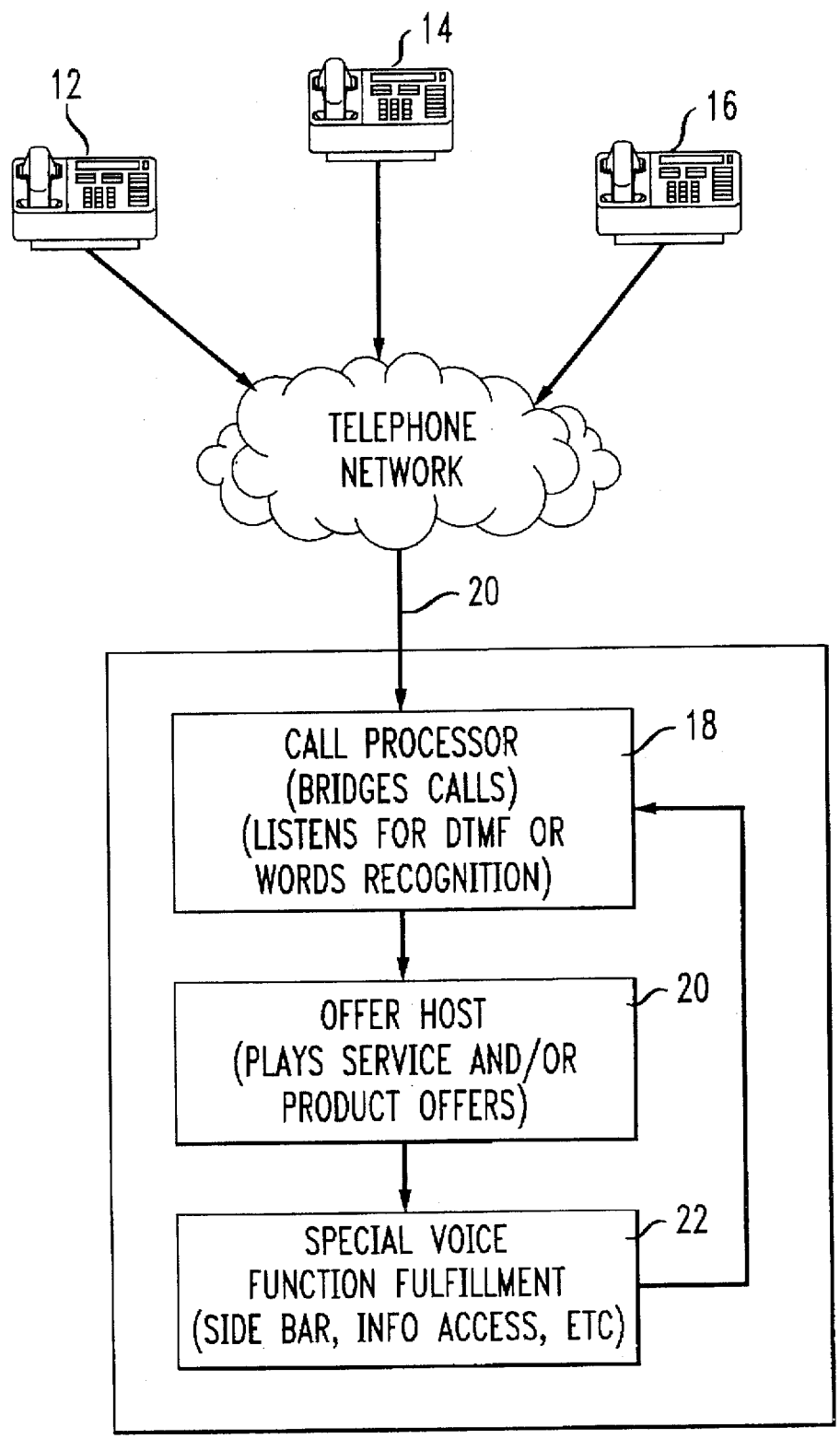
FIG. 1 shows a block diagram of a chat service platform, in conjunction with a telephone network, for practicing the present invention.

FIG. 1 shows a telephone network 10 maintained by a provider of telephone service, such as a Local Exchange Carrier (LEC) or an Inter-Exchange Carrier (IXC), such as AT&T. (Indeed, the network 10 could comprise portions of networks maintained by the LEC and IXC). The telephone network 10 comprises one or more telephone switches (not shown) and other equipment for connecting one of a set of subscribers 12, 14, and 16 to another subscriber. A subscriber 12 wishing to communicate directly with another subscriber 14 will first go "off-hook." In other words, the subscriber 12 will lift the receiver of his or her telephone set to receive a dial tone from the network 10. The subscriber 12 then dials the number of the subscriber 14. Upon receipt of the dialed number, the network 10 establishes a connection between the two subscribers.

In some instances, the telephone subscriber 12 may wish to communicate with several subscribers randomly during a chat session in a manner similar to the manner that computer users communicate with each other in "chat rooms" provided via an on-line service. To accommodate the desire for telephone subscribers to communicate with each other via chat sessions, the operator of the telephone network 10, or an independent entity, may provide a telephone-based chat service via a call platform 17 designed for this purpose. The call platform 17 includes a call processor 18, in the form of a well-known telephone bridge, that is coupled to the telephone network 10 via a trunk 20. The call processor 20 has the capability of bridging two or more calls together, thus allowing the subscribers 12, 14 and 16 to all communicate with each other during a chat session.

To communicate with each other in this fashion, each of the subscribers 12, 14 and 16 would first go off hook and then dial a number associated with the chat service. In accordance with the dialed number, the network 10 connects the subscribers 12, 14 and 16 to the call processor 18 which then bridges the subscribers' calls together. In practice, the call processor 18 possesses the ability to separately bridge individual calls. In this way, the call platform 16 can offer several chat sessions that may be differentiated by different topics.

In addition to bridging incoming subscriber calls, the call processor 18 also receives certain information from the network 10, such as the telephone number associated with subscriber. Well-known techniques exist for Automatic Number Identification (ANI) of a telephone subscriber, thereby identifying the subscriber for billing purposes.

In accordance with the invention, the provider of the chat service (i.e., the entity maintaining the platform 16) may wish to advise subscribers to the chat service of certain product and/or service offerings. To that end, the call platform 17 includes an offer host 20, in the form of a Voice Response Unit, for making various voice announcements, typically in the form of one or more successive menus, each prompting a particular subscriber response. For example, if the entity maintaining the platform 17 is a provider of long distance service, such as AT&T, that entity may provide a voice announcement advising chat service subscribers of special long distance discounts that may be available. The voice message may announce certain discounts to the chat service itself.

In some instances, it may be desirable for the call processor 18 to signal the offer host 20 to make the voice announcements after receipt of an incoming call but before the call is bridged. In other words, the offer host 20 makes the announcements to the subscriber prior to the subscriber actually joining the chat service. If the announcement provided by the offer host 20 requires no action by the subscriber, then, the subscriber automatically joins the chat session after a prescribed interval. Usually, the offer host 20 makes a series of voice announcements in succession, each announcement comprising a menu that prompts the subscriber to enter a particular response. For example, the initial voice announcement made by the offer host 20 may describe several different long distance discount plans. At the end of the initial announcement, the subscriber is promoted to select a particular plan by either speaking a particular word or by pressing a particular key on the telephone set to send a particular DTMF frequency.

Following an initial announcement that calls for a response from the subscriber, the call processor 18 "listens" for that response. The response from the subscriber is translated into an appropriate format for subsequent processing. For example, if the announcement initially offered the subscriber the opportunity to enroll in a particular long distance service plan, the subscriber response selecting that plan would be processed to enroll the subscriber as requested. Thereafter, the subscriber's long distance billing would be adjusted in accordance with the selected discount plan. Additionally, there could be a prompt to the subscriber to select a particular IXC, such as AT&T, if the subscriber has not already selected that carrier.

As discussed, the offer host 20 may announce a sequence of menus, each soliciting a particular response. Whether or not the offer host 20 announces a particular menu will typically depend on the subscriber's response following the previous menu. For example, the initial announcement made by the offer host 20 may comprise a menu offering the subscriber a choice among several long distance plans, each having several options. If the subscriber chooses not to enroll in any plan, then the offer host 20 will not make announcements regarding the features of a particular plan. Once the offer host 20 has made its last announcement (and the subscriber response or lack thereof has been registered), the subscriber's call is bridged so the subscriber may join the chat session.

While the chat session is underway, the subscriber may wish to obtain certain special features afforded by the call platform 17. For example, a subscriber may wish to engage in a private or "side bar" conversation with another chat session participant separate from the conversation occurring in the session. Alternatively, the subscriber may wish to receive information provided by the chat service. To provide the chat service subscribers with such features, the call platform 17 includes a special voice function fulfillment unit, in the form of a processor, coupled to the offer host 20 and to the call processor 18. The fulfillment unit 22 responds to command from the call processor 18 generated in response to voice/DTMF commands from the subscriber indicative of a desired feature. For example, if a subscriber wishes a private conversation, the subscriber will enter the appropriate command to the call processor 18 which, in turn, recognizes the command. Thereafter, the call processor generates commands that are transmitted through the offer host 20 to the fulfillment unit 22. The fulfillment unit 22 responds to the commands from the call processor to initiate the requested service.

As previously discussed, the call processor 18 may trigger the offer host 20 to provide one or more announcements to a subscriber at the outset of the chat session (i.e., prior to bridging the subscriber's call). Alternatively, the call processor 18 may trigger the offer host 20 once a subscriber has entered a command to receive a special feature via the fulfillment unit 22, such as a private conversation. Rather than trigger the offer host 20 prior to providing the subscriber with the requested special feature, the offer host could be triggered after providing the subscriber with the requested special feature. Thus, for example, the offer host 20 could be triggered to provide various announcements after a subscriber has ended a previously-requested private conversation during a chat session. If desired, the offer host 20 could be triggered at the outset of the chat session, prior to receipt of requested special service, and at the end of that service to provide either the same or differing messages. The nature and sequence of the announcements (the content and sequences of the announced menus) would be determined by the circumstances preceding the triggering of the offer host.

The foregoing describes a method for providing subscribers to a chat service with announcements of product and/or service offerings available to the subscriber from the provider of the chat service.

It is to be understood that the above-described embodiments are merely illustrative of the principles of the invention. Various modifications and changes may be made thereto by those skilled in the art which will embody the principles of the invention and fall within the spirit and scope thereof.

What is claimed is:

1. A method for alerting each subscriber already within a chat session operated by a telecommunications carrier about products and/or services available from the telecommunications carrier, including a discount on a communications service offered by the carrier, comprising the steps of:

providing at least one announcement to said each subscriber already within the chat session about a product and/or service offering available from the telecommunications carrier, including a discount on communications services offered by the carrier to prompt said each subscriber to enter at least one response indicative of a desire to obtain the offering;

listening for said each subscriber's response to the announcement; and providing said each subscriber with the offering in accordance with the response.

2. The method according to claim 1 wherein a plurality of announcements are made to said each subscriber in succession.

3. The method according to claim 2 wherein each of said announcements prompts said each subscriber for a response.

4. The method according to claim 1 wherein the product and/or service offering constitutes an offer of discounted long distance telephone service.

5. The method according to claim 1 wherein the product and/or service offering constitutes an offer of a discounted fee for the chat session.

6. The method according to claim 1 wherein the step of listening for said each subscriber's response includes the step of listening for Dual-Tone Multi-Frequency signals entered by said each subscriber.

7. The method according to claim 1 wherein the step of listening for said each subscriber's response includes the step of listening for voice commands entered by said each subscriber.

8. A method for alerting a subscriber within a chat session operated by a telecommunications carrier about products and/or services available from the telecommunications carrier, including a discount on a communications service offered by the carrier, comprising the steps of:

receiving from a subscriber already participating within a chat session a request for an enhanced feature available within the chat session;

providing, in response to said subscriber request, at least one announcement about a product and/or service offering distinct from the requested enhanced feature, the product and/or service offering being available from the telecommunications carrier, and including a discount on a communications service offered by the carrier, to prompt said subscriber to enter at least one response indicative of a desire to obtain the offering;

listening for said subscriber's response to said announcement;

providing said each subscriber with the offering in accordance with the response; and providing the subscriber with the requested enhanced feature.

9. The method according to claim 8 wherein a plurality of announcements are made to said each subscriber in succession.

10. The method according to claim 9 wherein each of said announcements prompts said each subscriber for a response.

11. The method according to claim 8 wherein the product and/or service offering constitutes an offer of discounted long distance telephone service.

12. The method according to claim 8, wherein the product and/or service offering constitutes an offer of a discounted fee for the chat session.

13. The method according to claim 8 wherein the step of listening for said each subscriber's response includes the step of listening for Dual-Tone Multi-Frequency signals entered by said each subscriber.

14. The method according to claim 8 wherein the step of listening for said each subscriber's response includes the step of listening for voice commands entered by said each subscriber.

* * * * *